United States Patent [19]
Mayer et al.

[11] Patent Number: 6,032,789
[45] Date of Patent: Mar. 7, 2000

[54] TUBULAR CONVEYOR BELT

[75] Inventors: Werner Mayer, Winnweiler; Rene Friedmann, Rödermark; Thomas Heinzler; Wolf-Dieter Koch, both of Eppertshausen; Friedrich Plutte, Darmstadt, all of Germany

[73] Assignee: Habasit GmbH, Rödermark, Germany

[21] Appl. No.: 08/816,214

[22] Filed: Mar. 12, 1997

[51] Int. Cl.[7] .................................................. B65G 15/08
[52] U.S. Cl. ............................................................ 198/819
[58] Field of Search ............................................. 198/819

[56] References Cited

U.S. PATENT DOCUMENTS

| | | | |
|---|---|---|---|
| 2,928,525 | 3/1960 | Schaeffer | 198/819 |
| 3,164,238 | 1/1965 | McCullagh | 198/819 |
| 3,661,244 | 5/1972 | Koyama | 198/819 |
| 3,999,646 | 12/1976 | Yoshida | 198/819 X |
| 4,397,974 | 8/1983 | Goyert et al. | 524/143 |
| 4,410,082 | 10/1983 | McGinnis | 198/819 X |
| 4,572,359 | 2/1986 | Fujita et al. | 198/819 |
| 5,083,658 | 1/1992 | Siwersson et al. | 198/819 |
| 5,239,004 | 8/1993 | Pyke et al. | 524/184 |
| 5,351,810 | 10/1994 | Tingskog | 198/819 |
| 5,400,899 | 3/1995 | Tingskog | 198/819 |
| 5,836,440 | 11/1998 | Mindich | 198/819 |
| 5,860,510 | 1/1999 | Becker | 198/819 |

FOREIGN PATENT DOCUMENTS

| | | | |
|---|---|---|---|
| 371180 | 6/1990 | European Pat. Off. | 198/819 |
| C695 | 2/1953 | Germany . | |
| 0194509 | 9/1986 | Germany . | |
| 3612765 | 10/1987 | Germany . | |
| 3734253 | 6/1989 | Germany . | |
| 62-8907 | 1/1987 | Japan | 198/819 |
| 2007178 | 11/1978 | United Kingdom . | |

*Primary Examiner*—James W. Keenan
*Attorney, Agent, or Firm*—Friedrich Kueffner

[57] ABSTRACT

A tubular conveyor belt and a method for its manufacture, wherein the tubular conveyor belt is composed of a support belt, and wherein the support belt is inseparably connected along both of its longitudinal sides to a drive belt. When constructing the conveyor belt, the drive belts can be placed flat on top of each other, so that the support belt encloses the material being transported. By dividing the tubular conveyor belt into a support belt, on the one hand, and two drive belts at the longitudinal sides, on the other hand, the conveying function is uncoupled from the drive function.

15 Claims, 1 Drawing Sheet

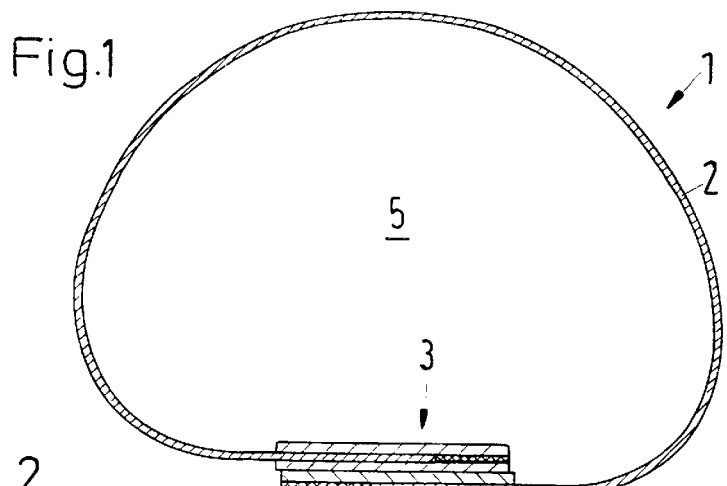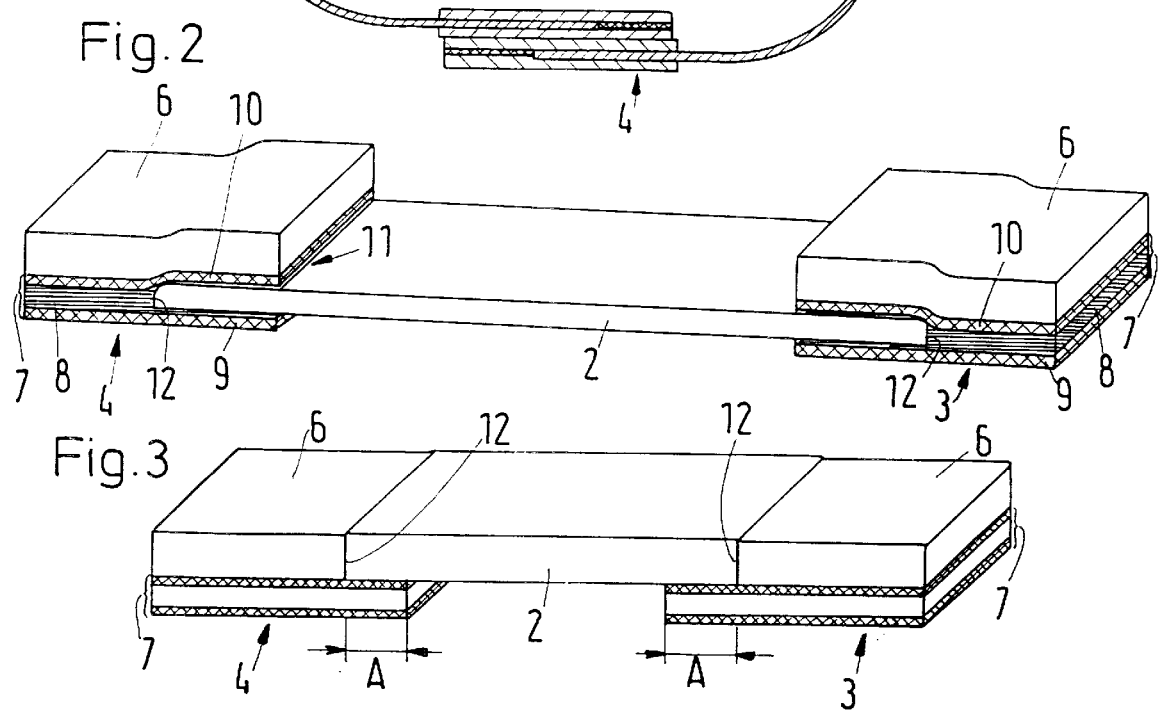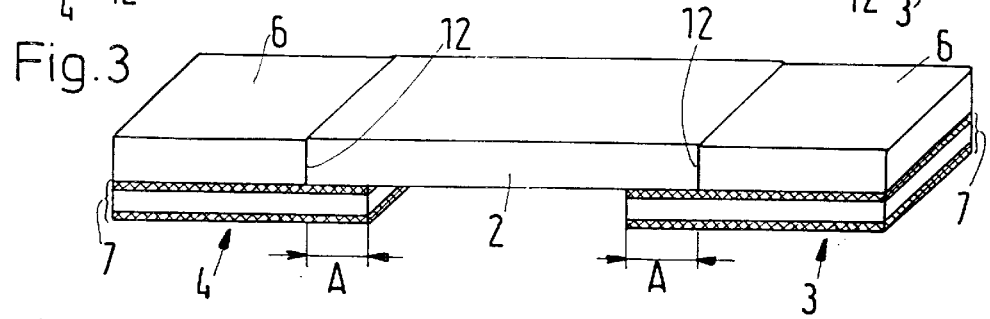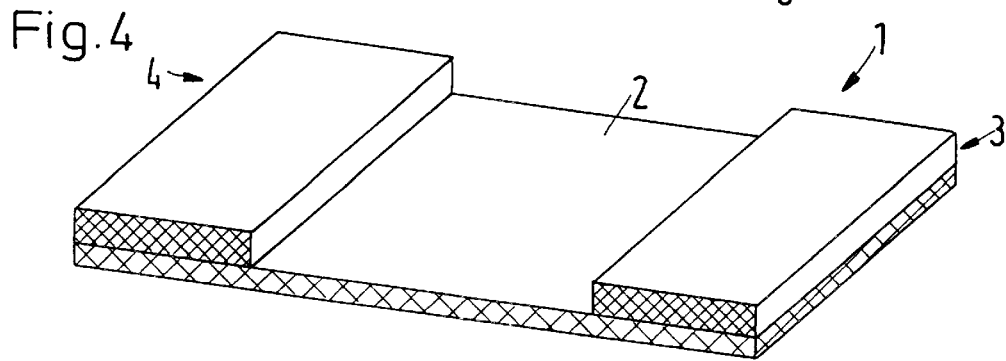

TUBULAR CONVEYOR BELT

BACKGROUND OF THE INVENTION

1. Field of the Invention

The present invention relates to a tubular conveyor belt and a method for its manufacture.

2. Description of the Related Art

For conveying bulk material, for example, powders or granular materials, conveyor belts are frequently used onto which the bulk material is placed. These conveyor belts have the advantage that relatively little energy is required for transporting the bulk material. However, the conveyance of bulk material is limited to horizontal routes or to routes with small inclines. In order to overcome greater heights or inclines, it is necessary to transfer the bulk material to another conveyor system, for example, a bucket chain conveyor.

Accordingly, it has been attempted in the past to shape a belt in a hose-like manner and to have the two belt edges overlap each other, so that the bulk material is received in a type of hose. However, it has been found that for maintaining the stability of such a tubular conveyor belt, the belt must be supported by many rollers which may partially even have to be arranged distributed over the circumference of the belt in order to maintain the shape. However, even with such a hose-like conveyor, it is not possible to overcome significant inclines. It is difficult to achieve tightness of the hose, so that a lot of bulk material drops out when the incline is in the range of 30–40°.

SUMMARY OF THE INVENTION

Therefore, it is the primary object of the present invention to provide a conveyor belt for conveying bulk material which has essentially no limitations with respect to the configuration of the conveying path.

In accordance with the present invention, a tubular conveying belt is provided which is composed of a support belt, wherein the support belt is inseparably connected along both of its longitudinal sides to a drive belt.

As used herein, the term "inseparably" means that the materials of the support belt and the drive belts are integrally connected, the support belts and the drive belts are glued together or the support belt and the drive belts are constructed as a single piece. Of course, the support belt and the drive belts can still be separated by force. However, this would then damage the belts. In contrast, in the case of other types of connections, such as sewing, riveting or screwing, it is possible to separate the support belt from the drive belts by separating or destroying the respective fastening means.

When constructing the conveyor belt, the drive belts can be placed on top of each other, so that the support belt encloses the material being transported. By dividing the tubular conveyor belt into a support belt, on the one hand, and two drive belts at the longitudinal sides, on the other hand, the conveying function can be uncoupled from the drive function. The support belt carries out the conveying function for the material to be conveyed. The support belt only has the purpose of holding the bulk material in and on the tubular belt conveyor. The drive belts carry out the drive function, i.e., they drive the support belt as well as the bulk material. It is important in this connection that the support belt and the drive belts are essentially constructed in one piece. Since for many reasons sometimes different materials will be used for manufacturing the support belt and the drive belts, it is necessary to connect these materials with each other.

In accordance with the present invention, the materials are integrally connected to each, i.e., the drive belts are connected to the support belt in such a way that they are practically a single unit. This connection can be produced during the manufacture of the tubular conveyor belt, for example, by constructing the drive belts and the support belt simultaneously in one piece, for example, by extruding, rolling or the like. This connection does not cause a weakening of the tubular conveyor belt. This is of substantial importance because the tubular conveyor belt constructed as a closed belt and moved in an endless circle, is subjected during its travel path to a multitude of bending plays which, in other types of connections, would pose the risk of permanent damage of the tubular conveyor belt.

Since the support belt can be constructed of a different material as the drive belts, the drive belts can be selected also with the goal of a good closure of the tubular conveyor belt; this is because the drive belts are components which are placed on top of each other or against each other when closing the tubular conveyor belt. The drive belts are relatively flat, belt-shaped or band-shape structures. They are placed flat on top of each other. The bulk material present in the closed belt presses the inner drive belt against the inner side of the outer drive belt which, in turn, can be supported by rollers or the like. Consequently, the connection formed by placing the drive belts flat against each other is sufficient to hold the material to be conveyed in the interior of the tubular conveyor belt.

It is an advantage that the support belt is continuously connected to the drive belts in longitudinal direction. The longitudinal direction is that direction in which the tubular conveyor belt travels. This type of connection results in a homogenous tubular conveyor belt in longitudinal direction which has a favorable effect on the stability during operation. For example, if the tubular conveyor belt has different bending stiffness over sections thereof, this could lead to excess loads acting on individual sections and to the danger of rupture. On the other hand, this danger is substantially lower when the structure is homogenous in longitudinal direction. Moreover, this type of connection ensures that the material being conveyed cannot pass between the support belt and the drive belts. This prevents losses during transportation.

In accordance with an advantageous feature, the support belt is glued or welded to the drive belts. These are integral connections which can be relatively easily realized. For effecting a glued connection, it is not absolutely necessary that adhesive is present between the support belt and the drive belts. It is sufficient in some types of synthetic materials to dissolve the synthetic material of one of the two components at its surface and then to connect the dissolved material with the synthetic material of the other of the two components. Sometimes the application of pressure is required. A higher temperature is required for welding. This higher temperature can be produced, for example, by infrared radiation, high frequency, hot air, etc.

In accordance with a preferred feature, the drive belts have a greater bending stiffness in transverse direction than the support belt. The drive belts ensure that the tubular conveyor belt can be completely closed, so that practically no losses occur even when conveying fine powders. Consequently, the drive belts preferably have a high transverse stiffness, a smooth surface on the side facing the bulk material (in order to prevent material from adhering) and they may possibly have a high friction value. This makes it possible to place the drive belts practically plane against each other when the tubular conveyor belt is closed. The tubular conveyor belt can then also be placed with the drive belts on transport rollers or guide rollers, so that a high stability of the tubular conveyor belt in the filled state is achieved, on the one hand, and it is ensured with a high degree of certainty that the tubular conveying belt is and remains closed, on the other hand. Moreover, the low bending stiffness of the support belt makes it possible that the shape of the support belt is adapted to the material being conveyed.

An even higher conveying efficiency is achieved particularly along sections extending in a straight line by twisting the closed tubular conveyor belt to some extent about its longitudinal axis. The support belt is a flat belt which, however, is usually wider than the drive belts.

It is also advantageous if the drive belts have a lower longitudinal flexibility than the support belt. Along bends, the drive belts will usually be "inside". Consequently, it must be possible to extend the support belt to a greater extent which is easily possible because of its higher flexibility.

In accordance with a preferred feature, the drive belts have a higher tensile strength than the support belt. The higher tensile strength makes it possible that the support belt can be subjected to greater loads in conveying direction in order to overcome, for example, any resistance, such as, bearing friction. The higher tensile strength corresponds to a higher modulus of elasticity in longitudinal direction.

The support belt is preferably connected with at least one surface thereof to the drive belts, wherein the drive belts at least partially cover the longitudinal edges of the support belt. Thus, the support belt is essentially inserted between the drive belts. The connection of the surface of the support belt to the respective surface of the drive belt ensures that the three components are reliably held together. However, the connection is further improved if the longitudinal edge of the support belt is at least partially covered. This type of connection is of particular advantage with respect to the many bending plays to be expected.

In accordance with a particularly preferred feature, the drive belts are connected to the longitudinal edges of the support belt. This not only achieves a fastening of the drive belts to the support belt parallel to the plane of these band-shaped belts, but also additionally a connection in perpendicular direction. The resulting "three-dimensional" connection further improves the reliability of the fastening of the drive belts to the support belt.

The drive belts are preferably split over a portion of their widths, wherein a support belt is arranged in the gap. This makes it possible to connect the support belt on its upper side and its bottom side to the drive belts without requiring additional measures. The drive belts still are single-piece components which enclose the support belt.

In accordance with an advantageous feature, the support belt replaces at least a portion of the volume of the drive belt in the gap of the split drive belt. Consequently, it is ensured that the thickness of the drive belt is not significantly increased even though the support belt is inserted. If at all, a small step is created in transverse direction, wherein, however, the step may be smaller than the thickness of the support belt.

Each drive belt preferably has a surface layer which is arranged only over a portion of the width of the drive belt, wherein the support belt is arranged in the remaining portion of the width and the surface layer as well as the support belt are fastened to a support layer having the width of the drive belt. Accordingly, in this embodiment, the support belt has replaced a portion of the surface layer of the drive belt. This also makes it possible to achieve the desired fastening at a surface of the support belt and its longitudinal edge.

The surface layer of the drive belts advantageously is of the same material or, taking into consideration the welding or gluing properties to the support layer of the drive belts, of a similar material as the support belt. This ensures that the support belt can be connected to the support layer of the drive belts equally well and reliably as the surface layer. Some experience has already been gained in the fastening of the surface layer to the support layer of the drive belt, so that this experience can be also applied without problems to the manufacture of the tubular conveyor belt.

In accordance with another advantageous feature, at least the surfaces facing the material being conveyed are made of a material which is suitable for foodstuffs. It is then possible to use the tubular conveyor belt also for conveying foodstuffs or foodstuff components (FDA/USDA conforming).

The support belt advantageously is constructed as a foil whose material is selected from the group of the thermoplastic polyurethanes, the polyether block amides and polyolefines. Especially the thermoplastic polyurethanes are compatible with foodstuffs. As a rule, the surface is smooth and not adhesive.

It is also advantageous if the connection between the support belt and the drive belts is free of adhesive. This means that there are no additional risks when the conveyor belt is used in the field of foodstuffs.

The present invention also relates to a method of manufacturing a tubular conveyor belt in which the support belt is welded or glued along its longitudinal sides to a drive belt each. As a result of this configuration, the above-described tubular conveyor belt can be manufactured easily and inexpensively.

In accordance with a preferred feature, each drive belt is provided with a slit in its longitudinal edge extending in longitudinal direction prior to connecting the drive belts to the support belt. The support belt is then inserted into the slit. This makes it possible that the drive belt is connected to the support belt along two surfaces of the support belt, so that the connection is very stable.

In accordance with an advantageous feature, material is removed from the slit prior to insertion of the support belt. The support belt then essentially replaces this material of the drive belts. As a result, it is possible to eliminate a step on the drive belt or to keep the step small.

In accordance with another embodiment, a surface layer is removed from each drive belt on a portion of its width, wherein the support belt is placed in the position of the surface layer. This makes it possible to achieve a relatively smooth surface in spite of the connection of the support belt to the drive belts. This connection between the support belt and the drive belts is relatively stable.

In accordance with a preferred embodiment, the support belt is connected to the drive belts with the application of heat and pressure. Particularly when synthetic materials are used at least in the areas of the connecting surfaces between support belt and drive belts, this makes it possible to achieve very easily a glued or welded connection, and good stability of the connection is achieved.

The various features of novelty which characterize the invention are pointed out with particularity in the claims annexed to and forming a part of the disclosure. For a better understanding of the invention, its operating advantages, specific objects attained by its use, reference should be had to the drawing and descriptive manner in which there are illustrated and described preferred embodiments of the invention.

BRIEF DESCRIPTION OF THE DRAWING

In the drawing:

FIG. 1 is a sectional view of the tubular conveyor belt according to the present invention shown in the conveying position;

FIG. 2 is a perspective view, partially in section, of a first embodiment of the tubular conveyor belt;

FIG. 3 is a perspective view, partially in section, of a second embodiment of the tubular conveyor belt;

FIG. 4 is a perspective view, partially in section, of a third embodiment of the tubular conveyor belt.

DETAILED DESCRIPTION OF THE PREFERRED EMBODIMENTS

FIG. 1 of the drawing shows a tubular conveyor belt 1 which includes a support belt 2 provided along both of its longitudinal sides with a drive belt 3, 4 each. For conveying, the two drive belts, which at least in transverse direction have a greater bending stiffness than the support belt 2, are placed on top of each other. Because of their greater stiffness, it is possible to place the drive belts practically plane on top of each other. The support belt 2 then has a curved shape as it is illustrated in FIG. 1. The curved configuration surrounds a conveying space 5 which is filled with material to be conveyed. The material presses the support belt 2 outwardly. The two drive belts 3, 4 are band-shaped, i.e., essentially plane and are placed flat on top of each other during conveying, so that the support belt 2 extends in the closed state of the tubular conveyor belt 1 toward the left and right as seen in conveying direction from the drive belts 3, 4 which are placed on top of each other, before curving upwardly.

The support belt 2 ensures that high degrees of filling can be achieved. For this purpose, the support belt 2 has a high elasticity in all directions and is stable against buckling to a high degree, i.e., the support belt 2 is capable of carrying out a multitude of buckling or bending plays without fatigue or brittling. The surface of the support belt 2 is constructed in such a way that the material being conveyed does not adhere; if necessary, the material of the surface must be adapted to each individual case.

For filling the tubular conveyor belt 1, it is advantageously turned upwardly by 180°, so that, after the drive belts 3, 4 have been moved apart from each other, an upwardly directed opening is available into which the bulk material can be filled.

For guiding the tubular conveyor belt 1, it is sufficient to move the drive belts 3, 4 which are placed together on guide rollers. Such a tubular conveyor belt makes it possible to overcome almost vertical conveying sections. If straight sections of such conveying sections exceed a certain length, it may be advantageous to twist the tubular conveyor belt 1 in itself, so that the drive belts 3, 4 form a type of spiral. This improves the stability of the tubular conveyor belt 1 in the position illustrated in FIG. 1. The higher the speed of the tubular conveyor belt 1, the steeper the inclines can be.

It is essential in this connection that the drive belts 3, 4 are correctly connected to the support belt 2 in order to ensure the necessary stability.

FIG. 2 of the drawing is a perspective view, partially in section, of a relatively short piece in longitudinal direction of the tubular conveyor belt 1 in the folded-out state. In reality, the tubular conveyor belt 1 is constructed as an endlessly circulating belt whose length may be several meters, several ten meters or even several hundred meters.

In the embodiment of FIG. 2, the support belt 2 is of a thermoplastic polyurethane. The thermoplastic polyurethane is present in the form of a foil.

The drive belts 3, 4 are composed of several layers; the layers are a surface layer 6, for example, also of thermoplastic polyurethane, and a support layer 7 or a bottom part which includes a fabric 8 which may also be impregnated. The fabric 8 forms an insert with tensile strength, so that tension forces can be absorbed without problems. In contrast, the support belt 2 is free of inserts with tensile strength. The fabric 8 is on both sides thereof coated with a synthetic material 9, 10, wherein the synthetic material 9, 10 at least partially penetrates or embeds the fabric. The synthetic material 9 forms a running side which is in contact with travel rollers during operation. The synthetic material 10 ensures the connection to the upper part 6. For example, the synthetic materials 9, 10 can also be selected from the group of thermoplastic polyurethanes or polyolefins. The synthetic materials should be capable of being melted together, so that an endless belt can be produced.

In the embodiment of FIG. 2, the support belt 2 is fastened to the drive belts 3, 4 by making a longitudinal slit 11 over the entire length of the drive belts 3, 4. The longitudinal slit has a width which corresponds approximately to half the width of the drive belts 3, 4. A portion of the material of the drive belts 3, 4 can be removed from this slit 11; in the illustrated embodiment, a portion of the fabric layer 8 is removed. The foil forming the support belt 2 is placed into this slit 11 which may be hollowed out. The upper side and the lower side of each drive belt 3, 4 are then pressed together with the application of pressure and increased temperature. This welds the support belt 2 to the drive belts 3, 4. The spacing and thickness of the various materials can be compensated by means of auxiliary sheets of metal which may be coated with polytetrafluoroethylene or similar materials to prevent sticking.

The pressure and the temperature as well as the time periods to be used depend on the materials. Generally, it can be assumed that the temperature is in the range of 100° C. to 200° C., while the pressure may be in the range of 0.5–2 bars.

In this embodiment, the upper side as well as the lower side of the support belt 2 are connected to the drive belts 3, 4. The longitudinal edge 12 of the support belt 2 is completely covered by the drive belts 3, 4. During welding, a connection between the longitudinal edge 1 of the support belt 2 with the drive belts 3, 4 is produced.

Instead of a thermoplastic polyurethane, the material of the support belt 2 may also be selected from the group of polyether block amides.

FIG. 3 of the drawing shows another embodiment in which the support belt 2 has been connected to the drive belts 3, 4 in a slightly different manner. The drive belts 3, 4 are not split. Rather, a portion of the width of the upper part 6 facing the support belt 2 is removed. This portion is identified by A in FIG. 3. Consequently, in the portion A, the drive belts 3, 4 only are composed of the bottom which, in this case, serves as a support layer 7 for the support belt 2. The support belt 2 is now placed in the space produced by removing the layer of the upper part 6, so that its longitudinal edge 12 contacts the layer forming the upper part 6. Also in this case, the longitudinal edge 12 is covered at least partially, but preferably completely. When the support belt 2 is welded to the drive belts 3, 4, this results in a connection at the bottom side of the support belt 2 with the support layer 7 in the area A of the drive belts 3, 4 and, in addition, a connection of the longitudinal edge 12 to the upper part 6 of the drive belts 3, 4.

Welding can be carried out, for example, under continuously heated rollers or in a double band press for applying the necessary pressure and the necessary temperature. The rollers make it possible to realize a continuous process in the manufacture of such a tubular conveyor belt. The tubular conveyor belt may also be cooled after welding, wherein rollers are used for this purpose which serve as cooling rollers. Pressure and temperature as well as the individual treatment times depend on the synthetic materials used.

FIG. 4 of the drawing shows a third embodiment in which the support belt 2 extends over the full width of the tubular conveyor belt 1. The drive belts 3, 4 are glued to the support belt 2 along the edges thereof. The support belt 2 is formed by a foil whose material has been selected from the group of polyether block amides. Such a foil is sold with the identification F109 by Habasit GmbH, Rödermark, Germany. The drive belt 3, 4 can be constructed in the same way as in FIGS. 1–3. They may have, for example, an impregnated or nonimpregnated fabric which is coated with a thermoplastic polyurethane, wherein a surface layer of thermoplastic polyurethane is applied on the conveying side. Such a drive belt is sold with the name FNB-8E by Habasit GmbH, Rödermark, Germany.

The drive belts 3, 4 can be glued to the support belt 2 by means of a two-component adhesive, as it is sold, for example, under the name "Polycol A+B" or "Primecol A+B" by Habasit GmbH, Rödermark, Germany. Gluing may also be carried with increased pressure and increased temperature. The surfaces of the support belt 2 and of the drive belts 3, 4 are advantageously roughened, are coated with an adhesive or an component and, after airing and another application, are fixed and pressed.

In all cases, the welding or the gluing of the support belt 2 to the drive belts 3, 4 results in a continuous connection between these parts. The longitudinal flexibility and the tensile strength in longitudinal direction remain practically constant. Neither the support belt 2 nor the drive belts 3, 4 are damaged at the connection. Consequently, there is no discontinuity which during later operation of the tubular conveyor belt 1 could result in local overstressing with the danger of the formation of cracks. Rather, a long service life can be achieved in the support belt 2 which is stable against buckling and which must carry out a multitude of opening and closing movements. The drive belts 3, 4 primarily only have to be bent in longitudinal direction. If the reinforcement of the drive belts 3, 4, i.e., the construction with inserts having tensile strength, is selected appropriately, the drive belts 3, 4 may also have an appropriately long service life.

In addition to the illustrated methods of constructing the tubular conveyor belt 1 in which the tubular conveyor belt 1 is manufactured from several intermediate products which may be of different types, it is also possible to manufacture the tubular conveyor belt 1 by common extrusion or coextrusion in which the materials of which the drive belts 3 and the support belt 2 are formed are extruded together with a textile structure or a bundle of threads.

The materials of the support belts may be, for example, aramid coated on both sides, PES, PA, PP (chain)/PES, PA-6, -66, PP, PEEK (weft) fabric or woven fabrics. The coating may be the same on both sides or the coatings may be different. It may be advisable to provide a coating on one side which has a better friction value than on the other side. This will be the side which makes contact with the support rollers, drive rollers or guide rollers. Aramid makes it possible to realize high circumferential forces while simultaneously providing a high longitudinal flexibility.

In addition or alternatively, it is also possible to use two fabrics with the same or similar construction (for example, warp multifil, weft monofil or impregnated multifil), wherein one is coated on one side and the other is coated on both sides. These two fabrics are laminated. By a suitable combination of the fabrics, layer thicknesses and coating materials, the desired properties in respect to modulus of elasticity in longitudinal direction, longitudinal flexibility and transverse stiffness are achieved. In many cases, it will also be sufficient to use two fabrics which are each coated on one side and to laminate these fabrics.

The support belt 2 is preferably of monolithic construction. For this purpose, preferably a coextruded foil is used for achieving ideal expansion properties, buckling behavior, further tearing properties, etc. Of course, it is also possible in this case to use a fabric which is coated on one side or on both sides, a woven fabric or a knitted fabric, which may also have to be elastic.

Finally, it is also possible to manufacture the entire tubular conveyor belt in one piece, for example, by coextrusion, possibly with simultaneous extrusion coating, or pultrusion. If yarns or other elements with tensile strengths are not to be used, it is also possible in the case of short conveying distances to achieve the necessary stability (necessary modulus of elasticity) by stretching of such a coextruded foil.

The inserts with tensile strengths are preferably formed by warp threads of one or more of the materials aramid, polyester, polyamid, steel or carbon fibers. The weft threads are preferably monofilic and are composed of one or more of the materials polyester, steel, aluminum, glass, polyvinyl, alcohol, polyethylene, polypropylene or multifilic fibers of carbon impregnated with synthetic materials. An elastic intermediate layer or a cover layer may be composed of one of the materials polyurethane, polyvinyl chloride, polyamid, polyamid, polyolefin, thermoplastic elastomer, nitrile butadien rubber, Hytrel, Pebax or a mixture of these materials.

The embodiments described above and shown in the drawing can be modified in many respects. For example, the drive belts must not necessarily be arranged underneath the support belt. They may also be fastened at the top side of the support belt. Finally, it is also possible to arrange a drive belt each above and below the support belt, or one or both drive belts next to the support belt in transverse direction.

The invention is not limited by the embodiments described above which are presented as examples only but can be modified in various ways within the scope of protection defined by the appended patent claims.

We claim:

1. A tubular conveyor belt comprising a support belt having a longitudinal direction and two longitudinal sides, and inner and outer drive belts, wherein the support belt is inseparably connected along each of its longitudinal sides to one of the drive belts, wherein the drive belts are essentially flat and are dispose relative to one another such that an outer side of the inner drive belt is placed flat against an inner side of the outer drive belt so that the conveyor belt forms a tubular cross-section, and wherein the drive belts have in a transverse direction a greater bending stiffness than the support belt.

2. The tubular conveyor belt according to claim 1, wherein the support belt is connected continuously in longitudinal direction to the drive belts.

3. The tubular conveyor belt according to claim 1, wherein the support belt is glued or welded to the drive belts.

4. The tubular conveyor belt according to claim 1, wherein the drive belts have a lower longitudinal flexibility than the support belt.

5. The tubular conveyor belt according to claim 1, wherein the drive belts have a higher tensile strength than the support belt.

6. The tubular conveyor belt according to claim 1, wherein the support belt is connected on at least one surface thereof to the drive belts, wherein the support belt has longitudinal edges, and wherein the drive belts at least partially cover the longitudinal edges of the drive belts.

7. The tubular conveyor belt according to claim 7, wherein the drive belts are connected to the longitudinal edges of the support belt.

8. The tubular conveyor belt according to claim 1, wherein the drive belts have a width, wherein the drive belts each have a slit extending over a portion of the width, and wherein the support belt is arranged in the slit.

9. The tubular conveyor belt according to claim 8, wherein each drive belt has in the slit thereof a recessed portion, wherein the support belt is received in the recessed portion.

10. The tubular conveyor belt according to claim 1, wherein each drive belt has a width, each drive belt having over a portion of its width a surface layer, wherein the support belt is arranged adjacent the surface layer, each drive belt further comprising a support layer, wherein the support layer has a width corresponding to a width of the drive belt, and wherein the surface layer as well as the support belt are fastened to the support layer.

11. The tubular conveyor belt according to claim 10, wherein the surface layers of the drive belts are of the same material as the support belt or are of a similar material with respect to welding or gluing properties of the support layer.

12. The tubular conveyor belt according to claim 1, wherein at least surfaces of the support belt and the drive belts facing an interior of the tubular conveyor belt are of a material which is compatible with foodstuffs.

13. The tubular conveyor belt according to claim 1, wherein the support belt comprises a foil, the foil being of a material selected from the group of thermoplastic polyurethanes and polyether block amides.

14. The tubular conveyor belt according to claim 1, wherein the connection between the support belt and the drive belts is free of adhesive.

15. A tubular conveyor belt comprising a support belt having a longitudinal direction and two longitudinal sides, and inner and outer drive belts, wherein the support belt is inseparably connected along each of its longitudinal sides to one of the drive belts, wherein the drive belts are essentially flat and are disposed relatively to one another such that an outer side of the inner drive belt is placed flat against an inner side of the outer drive belt so that the conveyor belt forms a tubular cross-section, and wherein the drive belts have in a transverse direction a greater bending stiffness than the support belt, and wherein the support belt extends above the drive belts, such that bulk material present in the tubular conveyor belt presses the inner drive belt against the inner side of the outer drive belt.

* * * * *